United States Patent Office 3,247,241
Patented Apr. 19, 1966

3,247,241
AROMATIC SULPHONAMIDES
Wilfried Graf, Binningen, near Basel, Erich Schmid, Basel, and Willy G. Stoll, Bottmingen, Basel-Land, Switzerland, assignors to Geigy Chemical Corporation, Ardsley, N.Y., a corporation of Delaware
No Drawing. Filed Nov. 22, 1961, Ser. No. 154,350
Claims priority, application Switzerland, Nov. 23, 1960,
13,139/60
8 Claims. (Cl. 260—484)

The present invention concerns processes for the production of new aromatic sulphonamides as well as the compounds obtained by these processes which have valuable pharmacological properties.

It has surprisingly been found that aromatic sulphonamides of the general formula

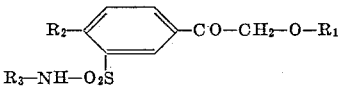

(I)

wherein $R_1$ represents hydrogen or an aliphatic acid radical having at most 5 carbon atoms,
$R_2$ represents a halogen atom, and
$R_3$ represents hydrogen or a low alkyl radical having at most 3 carbon atoms, have an excellent diuretic action on peroral or parenteral administration, whereby the excretion of sodium ions exceeds that of potassium ions to a remarkable and, for therapeutical purposes, to a very favourable extent. In addition, the compounds of general formula I have very slight toxicity and are well tolerated.

To produce the new compounds of the general Formula I, water or an oragnic acid of the general Formula II $$HO—R_1 \quad (II)$$

in which $R_1$ has the meaning given above, is reacted with a diazoketone of the general Formula III

(III)

wherein $R_2$ and $R_3$ have the meanings given above, the reaction possibly being performed in the presence of a slight amount of an inorganic acid, in particular an oxygen acid such as e.g. sulphuric acid, as well as possibly in the presence of slight amounts of heavy metal salts, in particular copper salts such as e.g. copper-(II)-sulphate, and in the presence or absence of an organic solvent such as e.g. dioxan. The reaction conditions depend on the reactivity of the acid used and generally consist in heating the reaction components for a shorter or longer time. The progress of the reaction is easily followed by watching the nitrogen development.

Possibly, when larger amounts of starting materials are used, one reaction component is added gradually, either in portions or continuously, to the other in order to attain a regular development of nitrogen.

Compounds of the general Formula I are obtained by a further process by reacting a reactive ester of a hydroxy ketone of the general Formula Ia

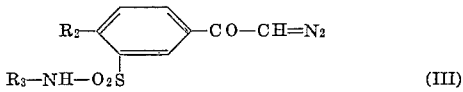

(Ia)

wherein $R_2$ and $R_3$ have the meanings given above, with a salt of an organic acid of the general Formula II and, if desired, converting the ester obtained into the corresponding hydroxy ketone. This reaction is performed, for example, by reacting, as reactive ester of a hydroxy ketone of the general Formula Ia, a halogen ketone of the general Formula IV

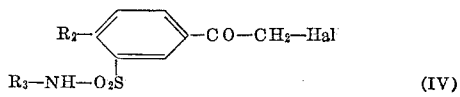

(IV)

wherein Hal represents chlorine or bromine and $R_2$ and $R_3$ have the meanings given above, with a metal salt of an organic acid of the general Formula II, e.g. with an alkali metal salt, a silver, mercury or lead salt. Examples of other reactive esters of hydroxy ketones of the general Formula Ia are the esters of methane sulphonic acid, p-toluene sulphonic acid and 2,4-dinitrobenzene sulphonic acid.

In the compounds of the general Formula I and in the corresponding starting materials, $R_1$ is, for example, the radical of an aliphatic carboxylic acid such as acetic acid, formic acid, propionic acid, butyric acid, isobutyric acid, valeric acid, isovaleric acid, acrylic acid, crotonic acid, propiolic acid, chloroacetic acid, dichloroacetic acid, β-chlorocrotonic acid, glycolic acid, lactic acid, glyceric acid, levulinic acid and ethoxyacetic acid.

$R_2$ is, for example, chlorine, bromine or fluorine, and $R_3$ is hydrogen, a methyl, ethyl, n-propyl or isopropyl radical.

Diazo ketones, as starting materials of the general Formula II, are produced for example by reacting the chlorides or bromides of acids of the general Formula V

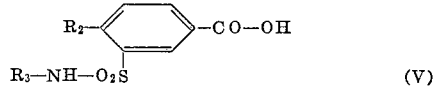

(V)

wherein $R_2$ and $R_3$ have the meanings given above, with diazomethane in a suitable inert organic solvent, e.g. in diethyl ether. Starting materials of the general Formula IV are formed, for example, from the diazo ketones of the general Formula II by reaction with hydrogen chloride or hydrogen bromide in diethyl ether or another inert organic solvent, or they are formed by reaction of such diazo ketones, preferably in the cold, with concentrated hydrochloric acid, e.g. in acetic acid, with liberation of nitrogen.

The following examples further illustrate the production of the new compounds according to the invention. Parts are given therein as parts by weight; their relationship to parts by volume is as that of grammes to cubic centimetres. The temperatures are in degrees centigrade.

*Example 1*

500 parts by volume of a diazomethane solution, produced in the known manner from 35 parts of nitrosomethyl urea, are poured, within 10 minutes, at 15–20° into a solution of 25.5 parts of 3-sulphamyl-4-chloro-benzoyl chloride in 1000 parts by volume of anhydrous ether. After standing for 15 hours at ambient temperature, the excess diazomethane is distilled off with the ether whereupon 3-sulphamyl-4-chloro-α-diazo-acetophenone remains in crystalline form.

This is dissolved at 50° in 400 parts by volume of dioxan and the solution is poured, within 10 minutes, into 400 parts of boiling water which contains 0.5 part of sulphuric acid. After refluxing for 2 hours, the reaction mixture is evaporated to dryness in vacuo and the crude product is recrystallised from methanol. 3-sulphamyl-4-chloro-α-hydroxy-acetophenone is obtained which melts at 209–212° (on decomposition).

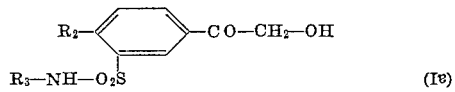

Example 2

3-sulphamyl-4-chloro-α-diazo-acetophenone produced according to Example 1 from 25.5 parts of 3-sulphamyl-4-chlorobenzoyl chloride, in 500 parts of glacial acetic acid and 0.5 part of sulphuric acid is refluxed for 1 hour. The solution is then evaporated to dryness in vacuo and the residue is recrystallised from water. 3-sulphamyl-4-chloro-α-acetoxy-acetophenone is obtained in this way. It melts at 183–185°.

In an analogous manner, on using propionic acid instead of acetic acid, 3-sulphamyl-4-chloro-α-propionyloxy-acetophenone (M.P. 149–150°) is obtained, on using chloroacetic acid (without the addition of sulphuric acid), 3-sulphamyl-4-chloro-α-chloroacetoxy-acetophenone (M.P. 163–165°) is obtained, on using butyric acid, 3-sulphamyl-4-chloro-α-butyryloxy-acetophenone (M.P. 124–126°) is obtained, and on using isovaleric acid, 3-sulphamyl-4-chloro-α-isovaleroyloxy-acetophenone (M.P. 133–135°) is obtained.

Example 3

3-sulphamyl-4-chloro-α-diazo-acetophenone produced as described in Example 1, is suspended in 100 parts of lactic acid and the suspension is heated to 70°. The temperature is kept at 70° until, after about 20–30 minutes, the nitrogen developemnt is complete and a clear solution is obtained. The reaction mixture is then cooled at 0° and 400 parts of ice water are added. The oily, crude product which separates, crystallises after a few hours. It is taken up in ether, the solution is dried with "Siccon" and the ether is evaporated off. The crystalline residue is recrystallised from n-amyl alcohol. In this way, 3-sulphamyl-4-chloro-α-lactoyloxy-acetophenone which melts at 198–199° is obtained.

What is claimed is:
1. An aromatic sulphonamide of the formula

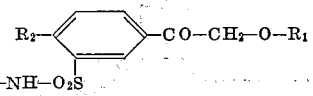

wherein
$R_1$ is a member selected from the group consisting of hydrogen, and the acyl radical of an aliphatic carboxylic acid selected from the group consisting of acetic acid, formic acid, propionic acid, butyric acid, isobutyric acid, valeric acid, isovaleric acid, acrylic acid, crotonic acid, propiolic acid, chloroacetic acid, dichloroacetic acid, β-chlorocrotonic acid, glycolic acid, lactic acid, glyceric acid, levulinic and ethoxyacetic acid,
$R_2$ is a member selected from the group consisting of fluorine, chlorine and bromine, and
$R_3$ is a member selected from the group consisting of hydrogen and alkyl of at most 3 carbon atoms.
2. 3-sulphamoyl-4-chloro-α-hydroxyacetophenone.
3. 3-sulphamoyl-4-chloro-α-acetoxyacetophenone.
4. 3-sulphamoyl-4-chloro-α-propionyloxyacetophenone.
5. 3-sulphamoyl-4-chloro-α-chloroacetoxyacetophenone.
6. 3-sulphamoyl-4-chloro-α-butyryloxyacetophenone.
7. 3-sulphamoyl-4-chloro-α-isovaleryloxyactophenone.
8. 3-sulphamoyl-4-chloro-α-lactoyloxyacetophenone.

No references cited.

LORRAINE A. WEINBERGER, *Primary Examiner.*
DANIEL D. HORWITZ, LEON ZITVER, *Examiners.*